(No Model.)

P. F. KEELYN.
WIRE CLAMP.

No. 332,347. Patented Dec. 15, 1885.

Witnesses:

Inventor:
Peter F. Keelyn
By Stout & Underwood
Attorneys.

UNITED STATES PATENT OFFICE.

PETER F. KEELYN, OF RACINE, WISCONSIN.

WIRE-CLAMP.

SPECIFICATION forming part of Letters Patent No. 332,347, dated December 15, 1885.

Application filed February 24, 1885. Serial No. 156,728. (No model.)

*To all whom it may concern:*

Be it known that I, PETER F. KEELYN, of Racine, in the county of Racine and State of Wisconsin, have invented certain new and useful Improvements in Wire-Clamps; and I do hereby declare that the following is a full, clear, and exact description thereof.

My invention relates to clamps for wire-stretchers, and will be fully described hereinafter.

Figure 1:
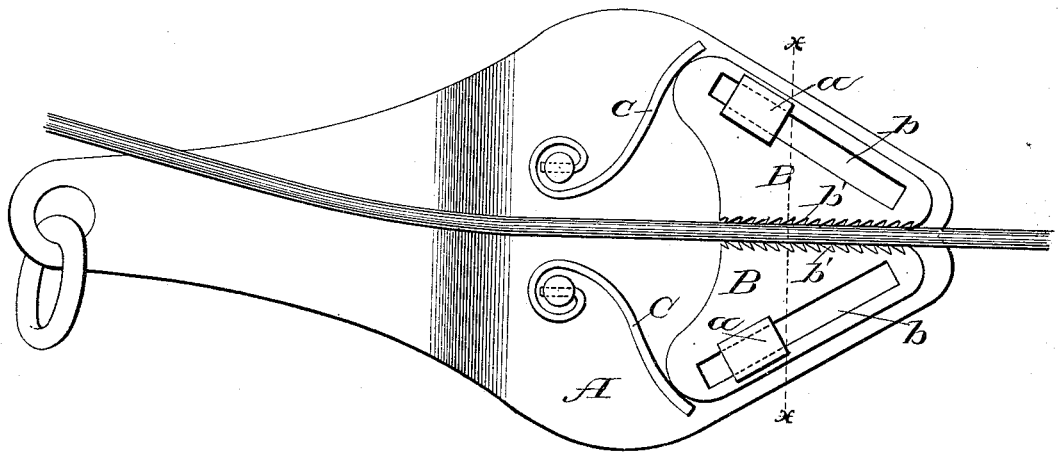
Figure 2:
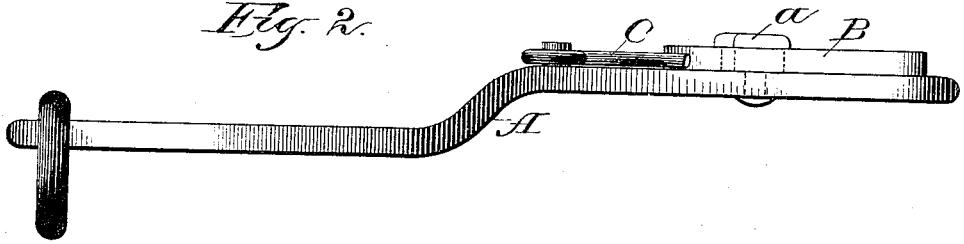
Figure 3:
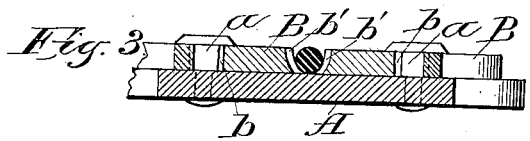

In the drawings, Figure 1 is a plan view of my invention. Fig. 2 is an edge view of the same, and Fig. 3 is a section on line $x\ x$, Fig. 1.

A is a plate that forms the back of my clamp, and B are triangular jaws that are secured upon one of its faces by headed guides $a$ that fit loosely in the slots $b$ of the jaws B. The adjacent faces of the jaws B are serrated, preferably as shown in Fig. 3, and the serrations $b'$ are concaved, so as to conform somewhat to the wire. The front and rear ends of the jaws B are rounded off, and the jaws are closed and thrown forward each by a spring, C, one end of which is secured to the backing, and the other end of which lies up against the rear end of a jaw.

The operation of my device is as follows: The wire is placed upon the teeth of the clamp and the clamp is thrust forward, the contact of the wire with the teeth as the clamp goes forward serving to open or separate the jaws and allow it to force itself in between them; but as soon as the draft is applied in an opposite direction, or the forward pressure ceases, the springs will force the jaws forward on the guides and cause the jaws to clamp the wire.

I do not confine myself to any particular style or arrangement of springs, as these may be varied indefinitely without departing from the spirit of my invention.

I am aware of the patent granted to G. M. Thompson, October 13, 1868, and claim nothing shown therein; but,

Having thus fully described my invention, what I claim as new, and desire to secure by Letters Patent, is—

1. In a wire-clamp, the slotted triangular jaws having teeth on their adjacent edges, in combination with springs for forcing them toward each other, and headed guides, the shanks of which extend from the clamp-plate through the slots of the jaws, fitting loosely in the latter, substantially as described.

2. The combination of plate A, jaws B, having teeth $b'$ on their adjacent edges, which teeth are concaved to better hold the wire, and which jaws are slotted to receive the shanks of the headed guides, the guides $a$, and springs, substantially as described.

In testimony that I claim the foregoing I have hereunto set my hand, at Racine, in the county of Racine and State of Wisconsin, in the presence of two witnesses.

PETER F. KEELYN.

Witnesses:
 J. E. KEELYN,
 S. S. STOUT.